(12) United States Patent
Kim et al.

(10) Patent No.: US 9,251,529 B2
(45) Date of Patent: Feb. 2, 2016

(54) ADVERTISEMENT PROVIDING SYSTEM AND METHOD

(75) Inventors: Jong-hyun Kim, Suwon-si (KR); Hyun-suk Min, Suwon-si (KR); Young-sik Lee, Suwon-si (KR); Dae-yeon Jeong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 642 days.

(21) Appl. No.: 13/213,847

(22) Filed: Aug. 19, 2011

(65) Prior Publication Data
US 2012/0150595 A1    Jun. 14, 2012

(30) Foreign Application Priority Data

Dec. 9, 2010 (KR) .................... 10-2010-0125660

(51) Int. Cl.
*G06Q 30/00* (2012.01)
*G06Q 30/02* (2012.01)

(52) U.S. Cl.
CPC .................. *G06Q 30/0241* (2013.01)

(58) Field of Classification Search
CPC ................................. G06Q 30/0241
USPC .......................................................... 705/14
See application file for complete search history.

(56) References Cited

U.S. PATENT DOCUMENTS

| | | | |
|---|---|---|---|
| 5,848,397 A * | 12/1998 | Marsh et al. ............... | 705/14.61 |
| 7,978,184 B2 * | 7/2011 | Morrison ...................... | 345/173 |
| 9,099,016 B2 * | 8/2015 | Seda ....................... | G09F 11/02 |
| 2003/0200128 A1 * | 10/2003 | Doherty ............................. | 705/8 |
| 2005/0043060 A1 * | 2/2005 | Brandenberg et al. ......... | 455/558 |
| 2006/0288258 A1 * | 12/2006 | Lo et al. ........................... | 714/46 |
| 2007/0214041 A1 * | 9/2007 | Patel et al. ...................... | 705/14 |
| 2008/0004953 A1 * | 1/2008 | Ma et al. .......................... | 705/14 |
| 2009/0132367 A1 * | 5/2009 | Hamada et al. ................. | 705/14 |
| 2010/0157063 A1 * | 6/2010 | Basso et al. .................... | 348/169 |
| 2011/0161136 A1 * | 6/2011 | Faith et al. .................... | 705/7.29 |
| 2011/0227800 A1 * | 9/2011 | Takahashi et al. ............ | 343/720 |
| 2012/0102523 A1 * | 4/2012 | Herz et al. ...................... | 725/34 |

\* cited by examiner

*Primary Examiner* — Matthew L Hamilton
(74) *Attorney, Agent, or Firm* — Sughrue Mion, PLLC

(57) ABSTRACT

Provided are an advertisement providing system and method. The advertisement providing method acquires information on a user interaction, acquires a second advertisement schedule which is generated by rescheduling a first advertisement schedule on the basis of the information on the user interaction, and provides an advertisement according to the second advertisement schedule.

6 Claims, 9 Drawing Sheets

ADVERTISEMENT PROVIDING SYSTEM AND METHOD

CROSS-REFERENCE TO RELATED PATENT APPLICATION

This application claims the benefit of Korean Patent Application No. 10-2010-0125660, filed on Dec. 9, 2010, in the Korean Intellectual Property Office, the disclosure of which is incorporated herein in its entirety by reference.

BACKGROUND

1. Field

Exemplary embodiments relate to an advertisement providing system, and more particularly, to an advertisement providing method and system, which use a Large Format Display (LFD) device installed indoors.

2. Description of the Related Art

A method of providing advertisements with an indoor Large Format Display (LFD) is currently in use, but the method merely provides advertisements according to a predetermined advertisement schedule or provides only indoor geographic information using a simple image map. That is, the method provides advertisements according to a unilateral advertisement schedule that has been set in the LFD, irrespective of a user's interest in an indoor Point Of Interest (POI).

SUMMARY

Exemplary embodiments provide an advertisement providing method and system, which provide an advertisement with an advertisement display device installed indoors, by changing a display mode to an indoor space model display mode to provide Point Of Interest (POI) information such as indoor shops and facilities when a user's request is inputted, and then adjusting an advertisement schedule on the basis of the searched and selected records of the user, and thus, provide an efficient advertisement suitable for the user's preference.

According to an aspect of exemplary embodiments, there is provided an advertisement providing method in an advertisement display device, including: acquiring information on a user interaction; acquiring a second advertisement schedule which is generated by rescheduling a first advertisement schedule on the basis of the information on the user interaction; and providing an advertisement according to the second advertisement schedule.

The advertisement providing method may further include: providing an advertisement according to the first advertisement schedule; and changing a display mode to an indoor space model display mode, wherein the information on the user interaction is obtained by recording the user interaction in the indoor space model display mode.

The acquiring of a second advertisement schedule may include: logging the user interaction in the indoor space model display mode to send logging information to an advertisement providing server; and receiving the second advertisement schedule from the advertisement providing server.

The information on the user interaction may include at least one information on point of interest which is selected by the user until the indoor space model display mode is ended.

According to another aspect of exemplary embodiments, there is provided a computer-readable storage medium storing a program for executing an advertisement providing method in an advertisement display device, executing: acquiring information on a user interaction; acquiring a second advertisement schedule which is generated by rescheduling a first advertisement schedule on the basis of the information on the user interaction; and providing an advertisement according to the second advertisement schedule.

According to another aspect of exemplary embodiments, there is provided an advertisement providing method in an advertisement providing server, including: receiving logging information on a user interaction from an advertisement display device; generating a second advertisement schedule by rescheduling a first advertisement schedule on the basis of the information on the user interaction; and sending the second advertisement schedule to the advertisement display device.

The advertisement providing method may further include sending indoor space model data when the advertisement display device requests data for displaying an indoor space model, wherein the information on the user interaction includes at least one information on a point of interest which is selected by the user in the indoor space model display mode using the indoor space model data.

The generating of a second advertisement schedule may include: analyzing the logging information to calculate a frequency of Point Of Interest (POI) use; and realigning a providing order of advertisements which are included in the first advertisement schedule, according to the frequency of POI use.

The generating of a second advertisement schedule may include: analyzing the logging information to calculate a frequency of POI use; and changing priorities of advertisements which are included in the first advertisement schedule, according to the frequency of POI use.

According to another aspect of exemplary embodiments, there is provided a computer-readable storage medium storing a program for executing an advertisement providing method in an advertisement providing server, executing: receiving logging information on a user interaction from an advertisement display device; generating a second advertisement schedule by rescheduling a first advertisement schedule on the basis of the information on the user interaction; and sending the second advertisement schedule to the advertisement display device.

According to another aspect of exemplary embodiments, there is provided an advertisement providing method in an advertisement display device, including: receiving destination information from at least one mobile device; determining one of the at least one mobile device as an advertisement target; and providing an advertisement corresponding to destination of the advertisement target.

The advertisement providing method may further include receiving at least one of position information and moving direction information from the at least one mobile device, wherein the determining of an advertisement target includes analyzing visibility for advertisement display on the basis of the received position information and moving direction information, and determining the advertisement target base on the analyzed visibility.

The providing of an advertisement may include determining an advertisement to be provided according to a destination category of the advertisement target.

The providing of an advertisement to be provided may include determining the advertisement to be provided in further consideration of a current time.

According to another aspect of exemplary embodiments, there is provided a computer-readable storage medium storing a program for executing an advertisement providing method in an advertisement display device, executing: receiving destination information from at least one mobile device;

determining one of the at least one mobile device as an advertisement target; and providing an advertisement corresponding to destination of the advertisement target.

According to another aspect of exemplary embodiments, there is provided an advertisement providing method using a mobile device, including: sensing a peripheral advertisement display device; measuring a current position and moving direction of the mobile device; and sending destination information and information of the measured current position and moving direction to the advertisement display device.

The advertisement providing method may further include performing route guidance to the destination.

The information sent to the advertisement display device may be used in advertisement scheduling of the advertisement display device.

According to another aspect of exemplary embodiments, there is provided a computer-readable storage medium storing a program for executing an advertisement providing method using a mobile device, executing: sensing a peripheral advertisement display device; measuring a current position and moving direction of the mobile device; and sending destination information and information of the measured current position and moving direction to the advertisement display device.

Information sent to the advertisement display device may be used in advertisement scheduling of the advertisement display device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Hereinafter, embodiments of the present invention will be described with reference to the accompanying drawings.

Figure 1:
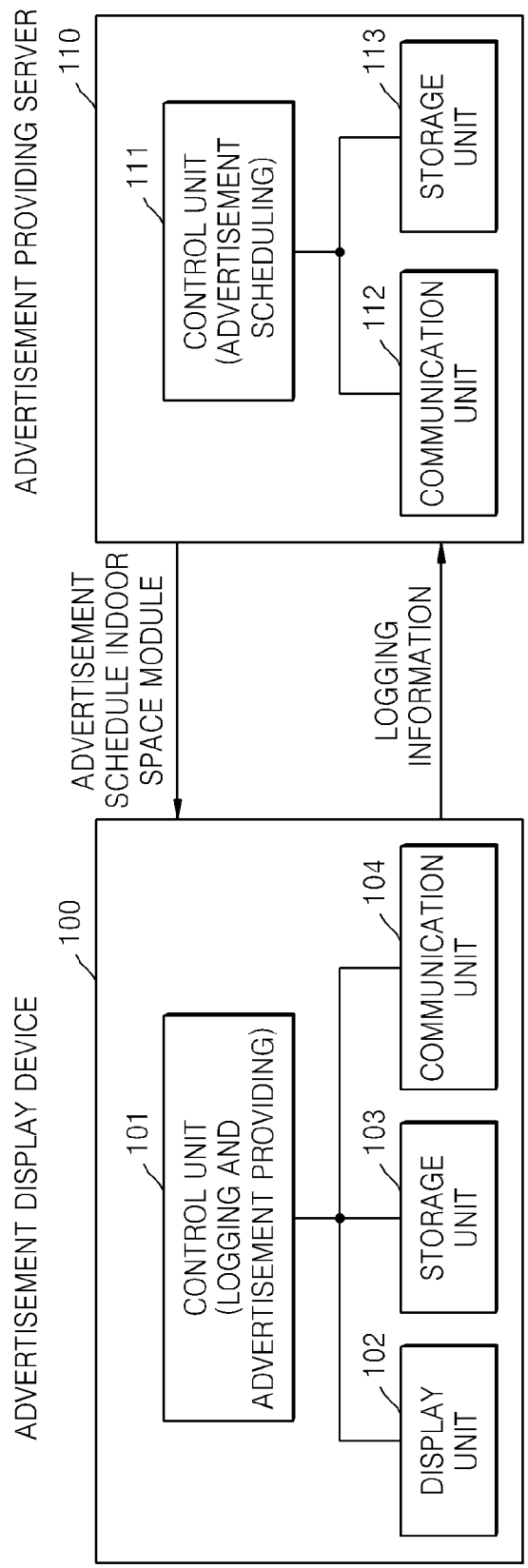
FIG. 1 is a block diagram illustrating an advertisement providing system according to an embodiment.

FIG. 1 is a block diagram illustrating an advertisement providing system according to an exemplary embodiment.

Referring to FIG. 1, an advertisement providing server 110 provides data necessary for displaying an advertisement and an indoor space model to an advertisement display device 100. The advertisement display device 100 provides advertisement service and indoor space model service to a user with data that is received from the advertisement providing server 110. The advertisement display device 100 sends information, which is obtained by logging a user's interaction in an indoor space model display mode, to the advertisement providing server 110. The advertisement providing server 110 analyzes the logged information and applies the analyzed information to a next advertisement schedule.

The advertisement display device 100 includes a display unit 102 for displaying an advertisement and an indoor space model, a storage unit 103 for storing an advertisement schedule, advertisement data and indoor space model data that are received from the advertisement providing server 110 and the information that is obtained by logging the user's interaction, and a communication unit 104 for communicating with the advertisement providing server 110. The advertisement display device 100 may receive the user's input or gesture with a touch screen that is disposed in the display unit 102. Alternatively, the advertisement display device 100 may include a camera, and sense the user's gesture with the camera. Moreover, the advertisement display device 100 includes a control unit 101 that controls the elements of the advertisement display device 100 to provide an advertisement and an indoor space model, and logs the user's interaction. The control unit 101 receives the advertisement schedule, the advertisement data and the indoor space model data from the advertisement providing server 110 through the communication unit 104, and sends the logging information to the advertisement providing server 110. The advertisement providing display device 100 may be a Large Format Display (LFD), but it is not limited thereto.

The advertisement providing server 110 includes a communication unit 112 for communicating with the advertisement display device 100, a storage unit 113 for storing the advertisement schedule, the advertisement data and the indoor space model data, and a control unit 111 that controls other elements, and generates and changes the advertisement schedule. The indoor space model provided by the advertisement providing server 110 may be a Three-Dimensional (3D) indoor space model, but it is not limited thereto.

Figure 2:
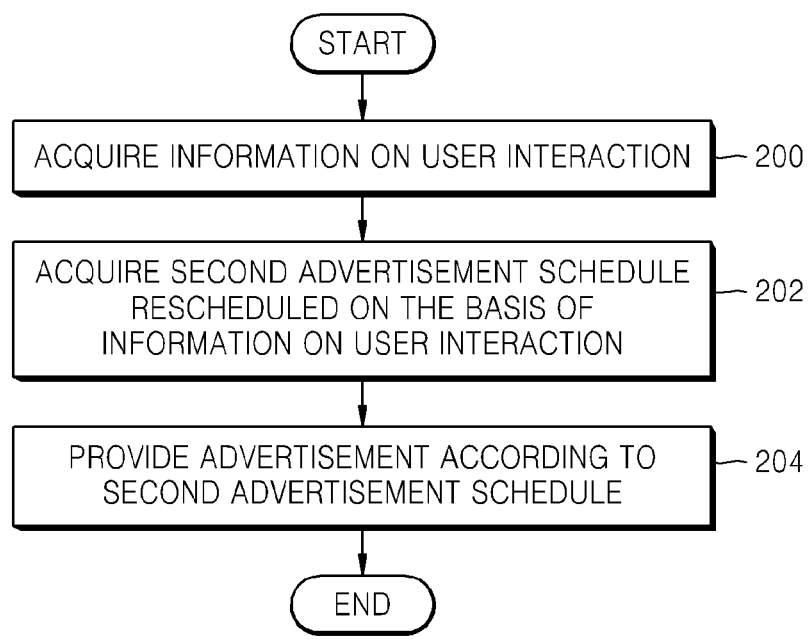
FIG. 2 is a flowchart illustrating an advertisement providing method in an advertisement display device, according to another embodiment.

FIG. 2 is a flowchart illustrating an advertisement providing method in the advertisement display device 100, according to another exemplary embodiment.

Referring to FIG. 2, the advertisement display device 100 acquires information on a user's interaction in operation 200. The advertisement display device 100 may provide an advertisement or operate in an advertisement mode according to a first advertisement schedule at an initial stage, and then when the advertisement display device 100 senses a user being near or receives a mode change request from the user, it may change a display mode to an indoor space model display mode for providing Point Of Interest (POI) information of an indoor space. The information on the user's interaction may be one that is obtained by logging the user's interaction in the indoor space model display mode. In operation 202, the advertisement display device 100 acquires a second advertisement schedule that is generated by rescheduling the first advertisement schedule on the basis of the information on the user's interaction. In operation 204, the advertisement display device 100 provides an advertisement according to the second advertisement schedule. Therefore, an advertisement based on the first advertisement schedule for a plurality of unspecified users is changed to an advertisement based on the second advertisement schedule that has applied the user's preference, and the changed advertisement is provided. The first and second advertisement schedules may be received from the advertisement providing server 110, but they are not limited thereto. The control unit 101 of the advertisement display device 100 may autonomously generate and change the first and second advertisement schedules.

Figure 3:
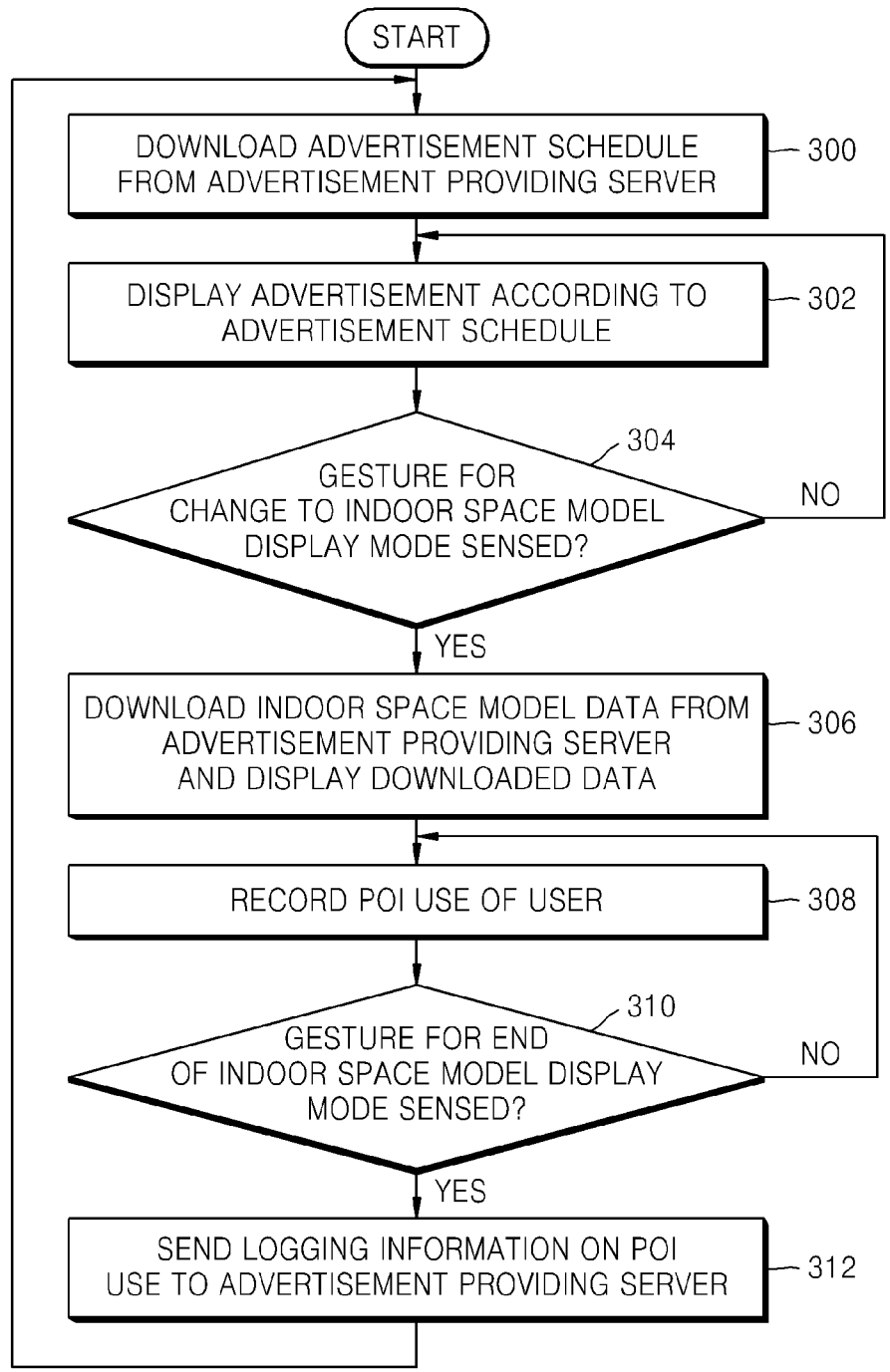
FIG. 3 is a flowchart illustrating an advertisement providing method in an advertisement display device, according to another embodiment.

FIG. 3 is a flowchart illustrating an advertisement providing method in the advertisement display device 100, according to another exemplary embodiment.

Referring to FIG. 3, the advertisement display device 100 downloads an advertisement schedule from the advertisement providing server 110 in operation 300. In operation 302, subsequently, the advertisement display device 100 displays an advertisement according to the downloaded advertisement schedule. In operation 304, the advertisement display device 100 monitors whether a user inputs a gesture that requests a change to an indoor space model display mode with a touch screen or inputs to a gesture sensing unit corresponding to an input unit thereof. In operation 306, when the change to the indoor space model display mode is requested, the advertisement display device 100 downloads indoor space model data from the advertisement providing server 110 and displays the downloaded data. In operation 308, the advertisement display device 100 logs a POI list that has been selected or searched as an item of interest by the user in the indoor space model display mode.

When a gesture that commands the advertisement display device 100 to end the indoor space model display mode is sensed in operation 310, and the advertisement display device 100 sends currently-recorded logging information regarding the use of POI to the advertisement providing server 110 in operation 312. In the embodiment, a gesture for requesting the change or end of a mode may include an action that touches a portion of a display screen, and a certain action near the advertisement display device 100. When ending the indoor space model display mode and thereafter providing advertisement service again, the advertisement display device 100 downloads a new advertisement schedule that has applied the POI use logging information from the advertisement providing server 110 and displays an advertisement according to the new advertisement schedule.

Figure 4:
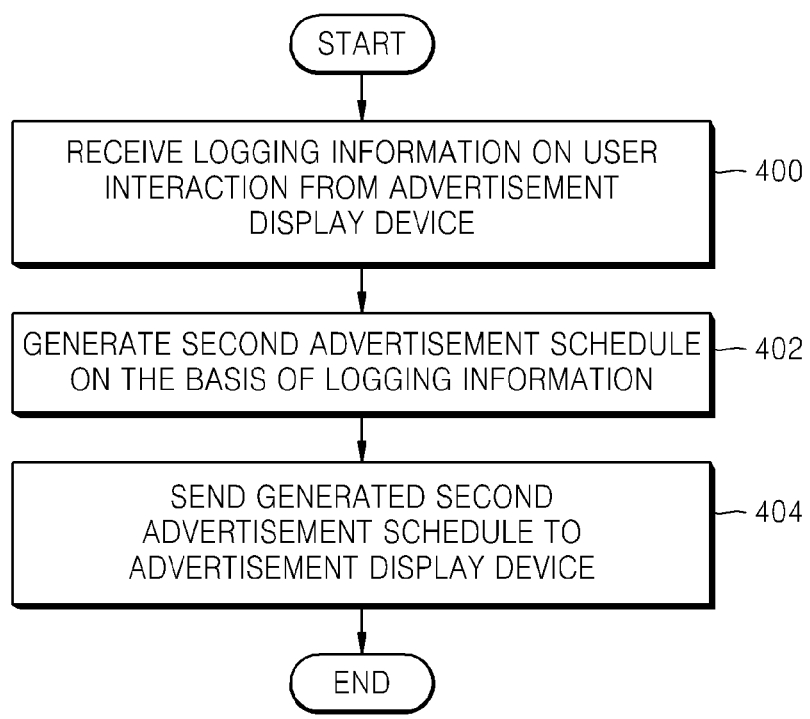
FIG. 4 is a flowchart illustrating an advertisement providing method in an advertisement providing server, according to another embodiment.

FIG. 4 is a flowchart illustrating an advertisement providing method in the advertisement providing server 110, according to another exemplary embodiment.

Referring to FIG. 4, when the advertisement providing server 110 receives logging information on a user's interaction from the advertisement display device 100 in operation 400, it analyzes the logging information to reschedule the existing first advertisement schedule and thus generates a second advertisement schedule in operation 402. The generated second advertisement schedule is sent to the advertisement display device 100 in operation 404. The logging information on the user's interaction may be received at a time when the advertisement display device 100 ends an indoor space display mode. The indoor space display mode is one where the advertisement display device 100 operates in an advertisement mode for providing an advertisement according to the first advertisement schedule and then provides POI information of an indoor space to the user according to the user's request. The advertisement display device 100 logs the user's interaction that is generated while operating in the indoor space display mode, and provides the logged information to the advertisement providing server 110 for advertisement rescheduling.

Figure 5:
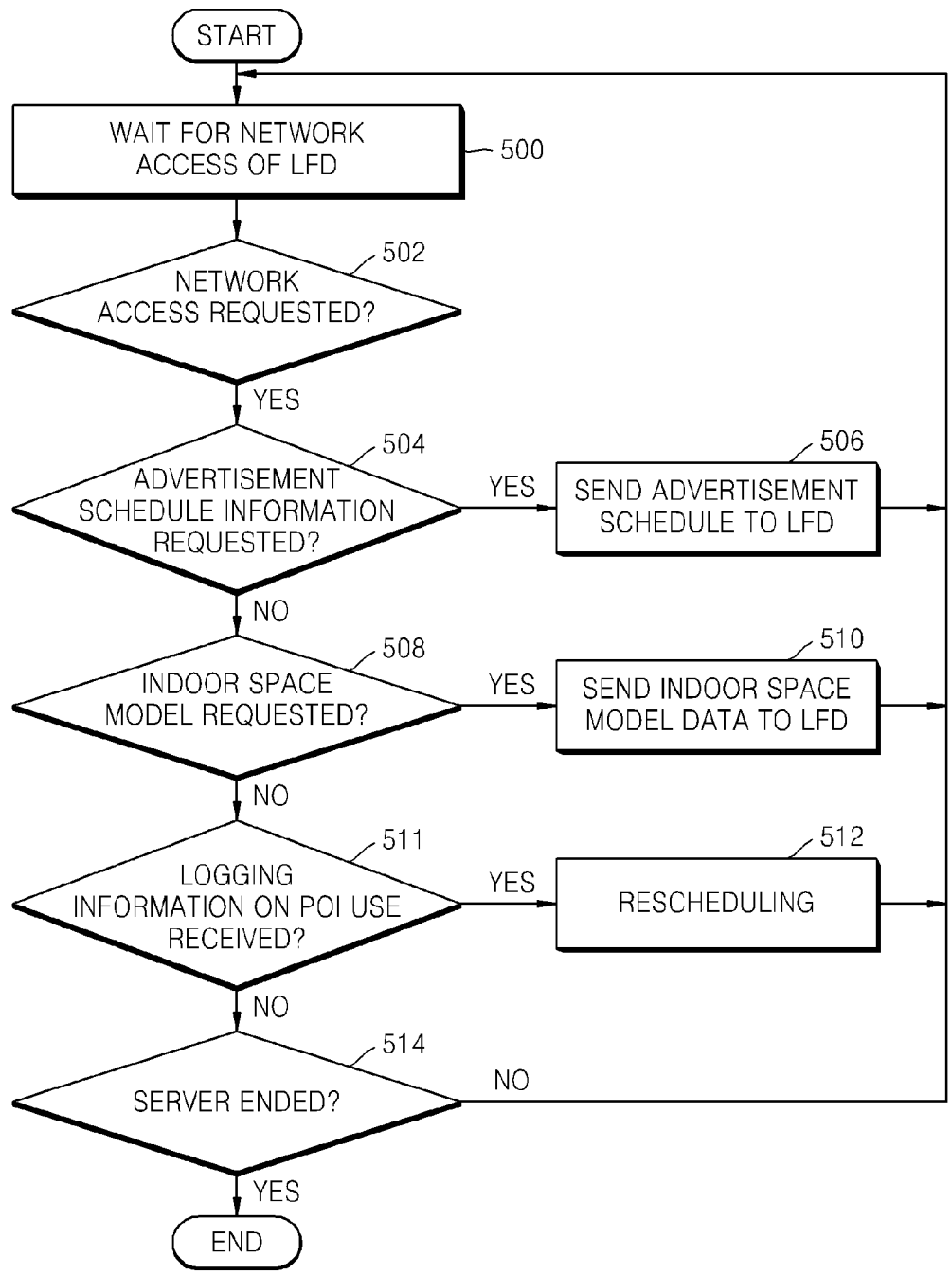
FIG. 5 is a flowchart illustrating an advertisement providing method in an advertisement providing server, according to another embodiment.

FIG. 5 is a flowchart illustrating an advertisement providing method in the advertisement providing server 110, according to another exemplary embodiment.

Referring to FIG. 5, the advertisement providing server 110 waits for access to the advertisement display device 100, which in this exemplary embodiment is an LFD, in operation 500, and then when the LFD requests network access and access is completed in operation 502, the advertisement providing server 110 provides service corresponding to the request of the LFD. When the LFD requests advertisement schedule information in operation 504, the advertisement providing server 110 sends the advertisement schedule information to the LFD in operation 506. When the LFD requests an indoor space model in operation 508, the advertisement providing server 110 sends data for displaying the indoor space model in operation 510. When logging information regarding the use of POI is received from the LFD in operation 511, the advertisement providing server 110 calculates the frequency of POI use that is included in the logging information and changes a current advertisement schedule to generate a new advertisement schedule according to the calculated result, in operation 512. The operations 500 to 512 are performed repeatedly until the advertisement providing server 110 ends operation in operation 514. Subsequently, when an advertisement schedule is requested in operation 504, the advertisement providing server 110 sends a rescheduled advertisement schedule, which has applied the use of POI, to the LFD.

Figure 6:
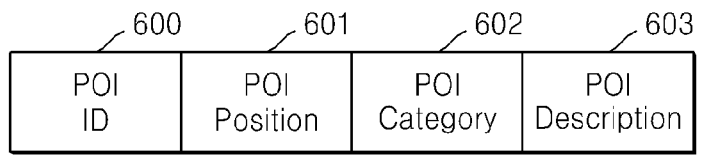
FIG. 6 is a diagram illustrating a structure of a Point Of Interest (POI) data record.

FIG. 6 illustrates a structure of a POI data record.

Referring to FIG. 6, the advertisement providing server 110 manages a plurality of POI information by using the POI data record that includes an identifier (ID) 600 for identifying a POI, a POI position 601 in an indoor space model, a POI category 602, and a POI description 603 including a detailed description on other POIs. According to exemplary embodiments, the advertisement display device 100 may store the POI data record. In embodiments that are illustrated in FIGS. 10 to 13, the advertisement display device 100 may schedule an advertisement on the basis of information of the POI data record.

Figure 7:
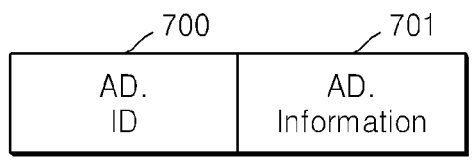
FIG. 7 is a diagram illustrating a structure of an advertisement data record.

FIG. 7 illustrates a structure of an advertisement data record.

Referring to FIG. 7, the advertisement providing server 110 manages an advertisement data record that includes an ID 700 for identifying an advertisement and advertisement information 701 such as an image or a moving image corresponding to the advertisement, and provides the advertisement data record to the LFD.

Figure 8:
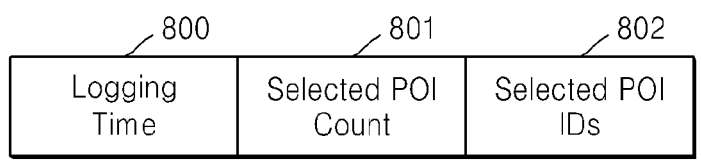
FIG. 8 is a diagram illustrating a structure of logging data record.

FIG. 8 illustrates a structure of a logging data record.

Referring to FIG. 8, logging information regarding the use of POI, which is provided from the advertisement display device 100 to the advertisement providing server 110 when a specific user ends a search of POI's in an indoor space model, includes a logging time 800, POI count 801 searched or selected by the user, and POI IDs 802 searched or selected by the user.

Figure 9:
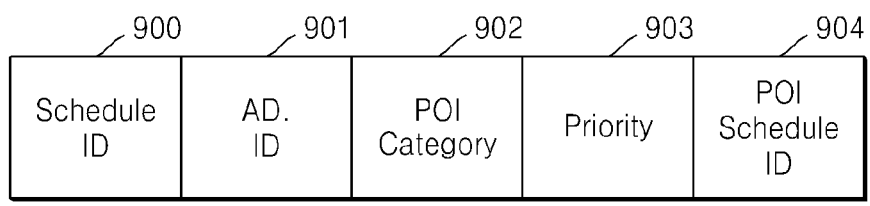
FIG. 9 is a diagram illustrating a structure of advertisement schedule data record.

FIG. 9 illustrates a structure of an advertisement schedule data record.

Referring to FIG. 9, the advertisement providing server 110 generates an advertisement schedule that defines the display order of advertisements and provides the generated schedule to the advertisement display device 100. The advertisement schedule data record includes a schedule ID 900, an advertisement ID 901, a POI category 902 associated with a corresponding advertisement, priority 903 of the corresponding advertisement, and a POI schedule ID 904 to be displayed subsequently. The advertisement schedule data record is implemented in a linked list type. When the advertisement providing server 110 receives POI use logging information, it parses the received information, and thereafter adjusts the priority 903 of the advertisement schedule data record according to the frequency of POI use to again set an advertisement schedule. For example, when the frequency of POI use for a specific category is high, the advertisement providing server 110 increases priority for advertisement of the specific category, but when the frequency of POI use for a specific category is low, the advertisement providing server 110 decreases priority for advertisement of the specific category. Subsequently, the advertisement providing server 110 realigns advertisement schedule data records. The advertisement display device 100 first displays an advertisement having high priority, repeatedly displays the advertisement several times, or controls a display period for advertisements to be faster, according to the rescheduled advertisement schedule.

Figure 10:
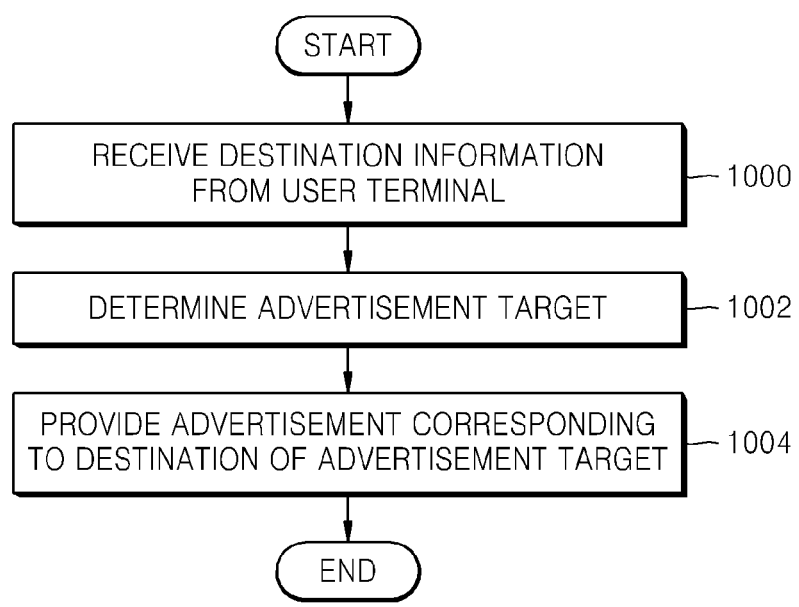
FIG. 10 is a flowchart illustrating an advertisement providing method in an advertisement display device, according to another embodiment.

FIG. 10 is a flowchart illustrating an advertisement providing method in the advertisement display device 100, according to another exemplary embodiment.

Referring to FIG. 10, the advertisement display device 100 receives destination information from at least one user terminal (for example, mobile devices) near to the advertisement display device 100 in operation 1000. The advertisement display device 100 determines one of a plurality of mobile devices that have sent the destination information as an advertisement target in operation 1002, and provides an advertisement corresponding to the destination of the determined mobile device in operation 1004.

Figure 11:
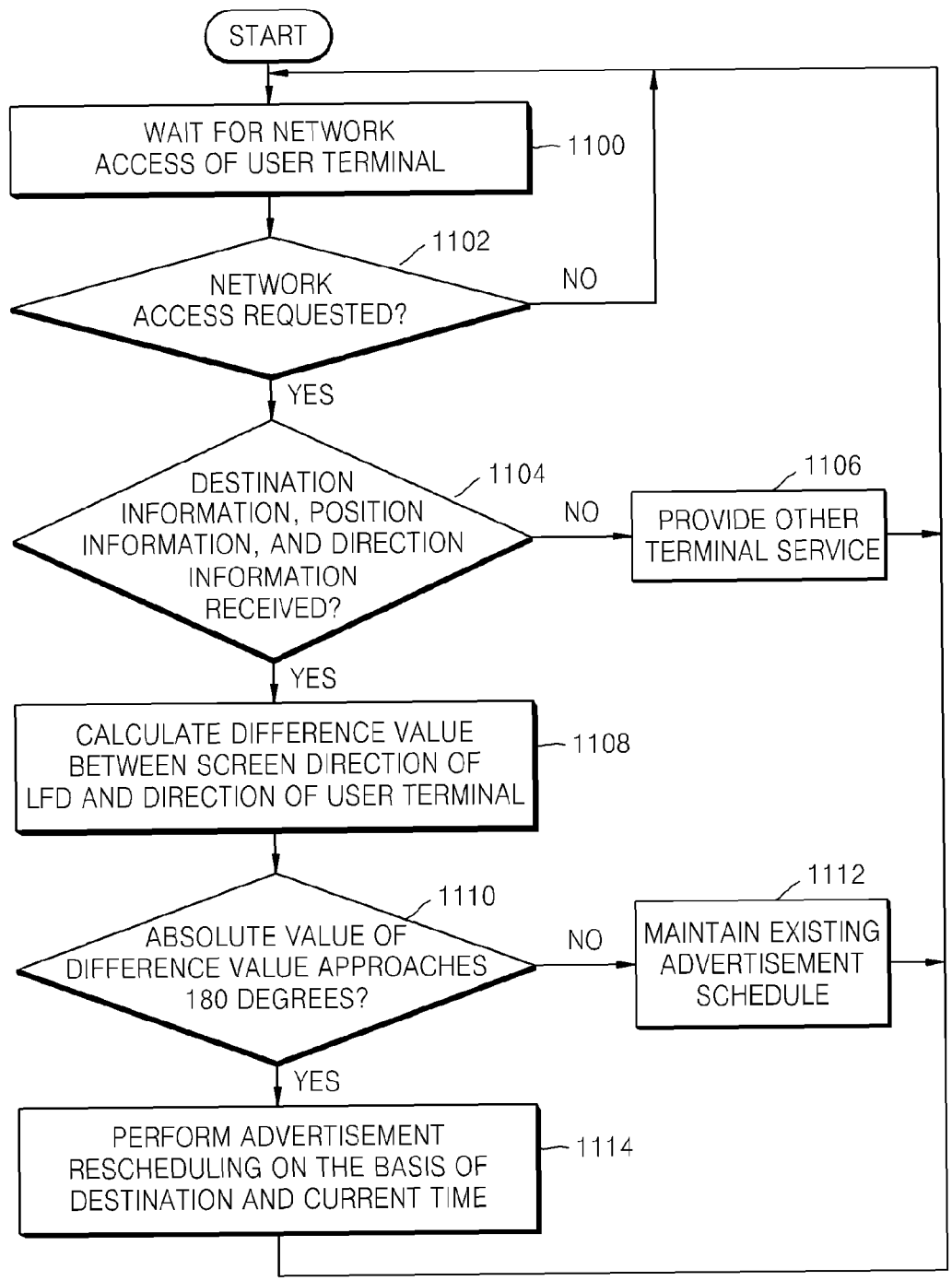
FIG. 11 is a flowchart illustrating an advertisement providing method in an advertisement display device, according to another embodiment.

FIG. 11 is a flowchart illustrating an advertisement providing method in the advertisement display device 100, according to another exemplary embodiment.

Referring to FIG. 11, the advertisement display device 100 waits for network access of a user terminal in operation 1100, and then when the user terminal requests network access in operation 1102 and the destination information, position information and direction information of the user terminal are received in operation 1104, the advertisement display device 100 changes an advertisement schedule on the basis of the received information. When another information or service request is received from the user terminal, the advertisement display device 100 provides corresponding service in operation 1106. The advertisement display device 100 calculates a difference value between the screen direction thereof and the direction of the user terminal in operation 1108. When the absolute value of the calculated difference value approaches about 180 degrees in operation 1110, i.e., when an advertisement displayed by the advertisement display device 100 has good visibility, the advertisement display device 100 determines a corresponding user terminal as an advertisement target, and reschedules an advertisement on the basis of the destination of the advertisement target and a current time so as to provide the optimal advertisement to a corresponding user in operation 1114. For example, when the destination of a user that is approaching a position across the advertisement display device 100 is a restaurant and a current time is lunch time, the advertisement display device 100 provides coupon information regarding the destination or a restaurant similar to the destination, or an advertisement on a dessert providing store. When a user terminal having good visibility does not exist as a determined result in operation 1110, the advertisement display device 100 maintains the existing advertisement schedule in operation 1112.

Figure 12:
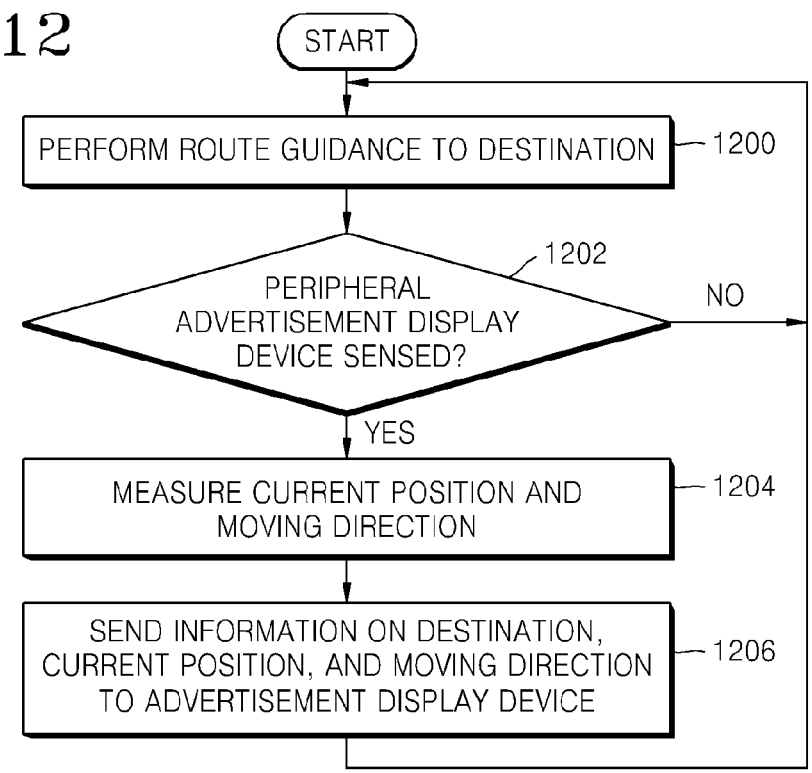
FIG. 12 is a flowchart illustrating an advertisement providing method using a mobile device, according to another embodiment.

FIG. 12 is a flowchart illustrating an advertisement providing method using a mobile device, according to another exemplary embodiment.

Referring to FIG. 12, when a peripheral advertisement display device is sensed in operation 1202 while a mobile device is providing indoor route guidance to a user in operation 1200, the current position and moving direction of the mobile device are measured in operation 1204. The current position may be periodically measured while the indoor route guidance is being provided. Information on destination, the current position and the moving direction is sent to the advertisement display device 100 in operation 1206.

Figure 13:
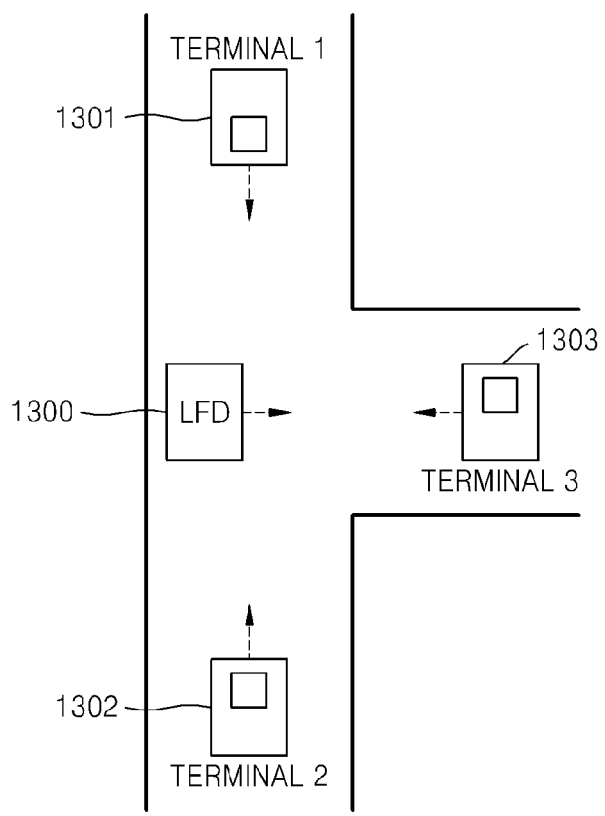
FIG. 13 is a diagram illustrating advertisement scheduling based on a screen direction of a Large Format Display (LFD) and moving directions of user terminals.

FIG. 13 illustrates advertisement scheduling based on a screen direction of an LFD 1300 and moving directions of user terminals 1301 to 1303. The LFD 1300 may include an orientation sensor such as a geomagnetic sensor, and the orientation sensor may automatically sense the screen direction of the LFD 1300. Alternatively, a manager may directly set the screen direction of the LFD 1300 when installing the LFD 1300.

When the three user terminals 1301 to 1303 access the LFD 1300 and send information on destination, current position and moving direction thereof to the LFD 1300, the LFD 1300 determines the user terminal 3 1303, which may best see a screen thereof, as an advertisement target based on the moving directions of the user terminals 1301 to 1303. The LFD 1300 reschedules an advertisement on the basis of destination and/or a current time that are/is sent by the user terminal 3 1303.

When the user terminal 3 1303 does not exist and only the user terminals 1 and 2 1301 and 1302 having the same difference value between the screen direction of the LFD 1300 and the respective moving directions of the user terminals 1 and 2 are approaching the LFD 1300, the LFD 1300 determines the nearest user terminal of the user terminals 1 and 2 1301 and 1302 as an advertisement target based on the current positions of the user terminals 1 and 2 1301 and 1302, and thereafter reschedules an advertisement on the basis of the destination of the advertisement target and/or a current time.

Accordingly, the present embodiment does not provide a unilateral advertisement in accordance with a predetermined advertisement schedule but performs scheduling in an order of priority that advertisements attract user interest, and thus, can efficiently provide advertisements on the basis of indoor POI information using the 3D indoor space model.

While the present invention has been particularly shown and described with reference to exemplary embodiments thereof, it will be understood by those of ordinary skill in the art that various changes in form and details may be made therein without departing from the spirit and scope of the present invention as defined by the following claims. The invention can also be embodied as computer readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer readable code is stored and executed in a distributed fashion.

What is claimed is:

1. An advertisement providing method in a display device, said display device comprising an orientation sensor and a processor coupled to the orientation sensor, the advertisement providing method comprising:
   receiving, by the processor and via a network, a moving direction of a mobile device;
   determining, by the orientation sensor, a direction of the display device;
   calculating, by the processor, a difference value between the direction of the display device determined by the orientation sensor and the moving direction of the mobile device;
   analyzing, by the processor, visibility for an advertisement display based on the calculated difference value, wherein the analyzing of the visibility comprises determining that the visibility is good when the absolute value of the calculated difference value approaches 180 degrees;
   acquiring, by the processor, a second advertisement schedule for the mobile device, wherein the acquiring the second advertisement schedule comprises:
      rescheduling a first advertisement schedule according to the analyzed visibility; and
      providing, by the processor, an advertisement according to the second advertisement schedule.

2. The advertisement providing method of claim 1, further comprising receiving, by the processor and via the network, information on a destination of the mobile device,
   wherein the second advertisement schedule for the mobile device is generated in consideration of the destination of the mobile device.

3. The advertisement providing method of claim 1, wherein the second advertisement schedule for the mobile device is generated in consideration of a current time.

4. A non-transitory computer-readable storage medium storing instructions, which, when executed by a processing system, causes the processing system to perform an advertisement providing method in a display device, said display device comprising an orientation sensor and a processor coupled to the orientation sensor, the method comprising:
   receiving, by the processor and via a network, a moving direction of a mobile device;
   determining, by the orientation sensor, a direction of the display device;
   calculating, by the processor, a difference value between the direction of the display device determined by the orientation sensor and the moving direction of the mobile device;
   analyzing, by the processor, visibility for an advertisement display based on the calculated difference value, wherein the analyzing of the visibility comprises determining that the visibility is good when the absolute value of the calculated difference value approaches 180 degrees;
   acquiring, by the processor, a second advertisement schedule for the mobile device, wherein the acquiring the second advertisement schedule comprises:
      rescheduling a first advertisement schedule according to the analyzed visibility; and
      providing an advertisement according to the second advertisement schedule.

5. The advertisement providing method of claim 1, wherein in the determining, the orientation sensor is a geomagnetic sensor.

6. The non-transitory computer-readable storage medium of claim 4, wherein the orientation sensor is a geomagnetic sensor.

* * * * *